United States Patent
Carlson et al.

(10) Patent No.: US 7,359,864 B2
(45) Date of Patent: Apr. 15, 2008

(54) METHOD OF SCHEDULING APPOINTMENTS

(76) Inventors: Kent R. Carlson, 626 Burdick St., Libertyville, IL (US) 60048; David C. McCreight, 22526 Yankee Bit La., Spring Hill, KS (US) 66083

( * ) Notice: Subject to any disclaimer, the term of this patent is extended or adjusted under 35 U.S.C. 154(b) by 1127 days.

(21) Appl. No.: 10/306,358

(22) Filed: Nov. 27, 2002

(65) Prior Publication Data

US 2004/0102983 A1  May 27, 2004

(51) Int. Cl.
*G06F 17/60* (2006.01)
(52) U.S. Cl. .......................................... 705/9
(58) Field of Classification Search ............ 705/9
See application file for complete search history.

(56) References Cited

U.S. PATENT DOCUMENTS

| | | | | |
|---|---|---|---|---|
| 7,174,303 | B2 * | 2/2007 | Glazer et al. ............. | 705/9 |
| 7,233,907 | B2 * | 6/2007 | Young ..................... | 705/8 |
| 2001/0049619 | A1 * | 12/2001 | Powell et al. ............ | 705/9 |
| 2002/0065702 | A1 * | 5/2002 | Caulfield ................. | 705/9 |
| 2002/0107716 | A1 * | 8/2002 | Callahan et al. ......... | 705/9 |
| 2002/0147654 | A1 * | 10/2002 | Kraisser et al. ......... | 705/26 |

OTHER PUBLICATIONS

Dais and SmallHill Inc. Merge to Create Quivox Systems Inc., Provider of online Claims and Underwriting Tools, BusinessWire, Oct. 3, 2000.*
Quivox.com, Dec. 2, 2000, http://wed.archive.org/web/20001202220100 /www.quivox.com/products.html.*

* cited by examiner

*Primary Examiner*—Beth Van Doren
*Assistant Examiner*—Justin M. Pats
(74) *Attorney, Agent, or Firm*—Spencer Fane Britt & Browne LLP

(57) ABSTRACT

A method is provided for scheduling an appointment by a service provider and for load leveling by the service provider. In the context of a vehicle collision repair service provider, the instant invention permits the service provider to balance the intake and outflow of new repair jobs to improve the work flowing through the service provider's facility. Through the instant invention, job drop-off slots and job delivery slots are allocated throughout a production period based upon production goals and capacities for the service provider. The program determines a first available drop-off slot for a specific job and presents the slot as a possible schedule option for scheduling the appointment. Load leveling between multiple facilities of a service provider is accomplished by allowing one facility to access the schedule database of an other facility and schedule appointments.

4 Claims, 2 Drawing Sheets

METHOD OF SCHEDULING APPOINTMENTS

FIELD OF THE INVENTION

The present invention relates to a method of scheduling an appointment. The invention permits a service provider to balance the intake and outflow of new jobs to improve the work flowing through the service provider's facility. Job drop-off and job delivery slots are allocated throughout a production period and jobs are scheduled into the drop-off and delivery slots to balance evenly the work-load for the service provider throughout a production period.

BACKGROUND OF THE INVENTION

Current scheduling systems function primarily as calendars to simply record dates and times in which appointments are scheduled. These scheduling systems of the prior art allow a service provider to track jobs that have been scheduled, but do not assist the service provider in balancing the intake and outflow of new jobs to improve workflow through a facility. Furthermore, these prior art scheduling systems do not assist the service provider in calculating the first available date in which an appointment can be scheduled for completion of a specific job. Instead, the service provider must manually browse through a calendar to see when appointments have already been scheduled and make a judgement call as to whether the job can be scheduled between other jobs that have already been scheduled. This can be extremely time consuming, inefficient and ineffective.

The current practice for service providers, such as vehicle collision repair service providers, is to schedule work only for drop-off. Collision repair service providers generally have vehicles dropped off for repair at the beginning of a production week and attempt to make delivery (i.e. completion of the repair job) of as many vehicles as possible by the end of the production week. This practice is extremely inefficient, and results in reducing the potential workflow through the facility.

SUMMARY OF THE INVENTION

A principal object of the present invention is to balance the dropping off, or inflow, of appointments with the delivery, or outflow, of appointments throughout a production period to improve the workflow through a service provider's facility. Another object of the instant invention is to balance the dropping off, or inflow, of vehicles with the delivery, or outflow, of vehicles throughout a production week to improve the workflow through a vehicle collision repair facility. Another object of the instant invention is to strive to balance the number of production hours necessary for completion of jobs that are dropped off on any given production day to evenly distribute the workload of a facility throughout the production week. Yet another object of the instant invention is to strive to balance the number of vehicles that are dropped off and delivered on any given production day to evenly distribute the workload of a facility throughout the production week.

The above objective are achieved by allocating job drop-off and job delivery slots throughout a production period. A computer program will allocate job drop-off and delivery slots on a one-to-one ratio within a schedule database. Job drop-off slots of varying size categories are allocated throughout the production period. The program will strive to provide an even balance of the number of jobs dropped off on any given day during the production period as well as the total hours necessary to complete the jobs that dropped off on any given day during the production period; however it is understood that the daily balance of jobs dropped off and total hours dropped off will often vary.

Once job drop-off and delivery slots are allocated in the schedule database, jobs can be scheduled into those slots. The time necessary to complete a job is estimated and entered into the computer program. Based upon the estimated time, the job is classified into a job size category by the computer program. The program will then perform an iterative process to calculate a first available drop-off slot for the job, and present that first available drop-off slot as a schedule option.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

Preferred embodiments of the present invention are hereinafter described with reference to the accompanying drawings.

Figure 1:
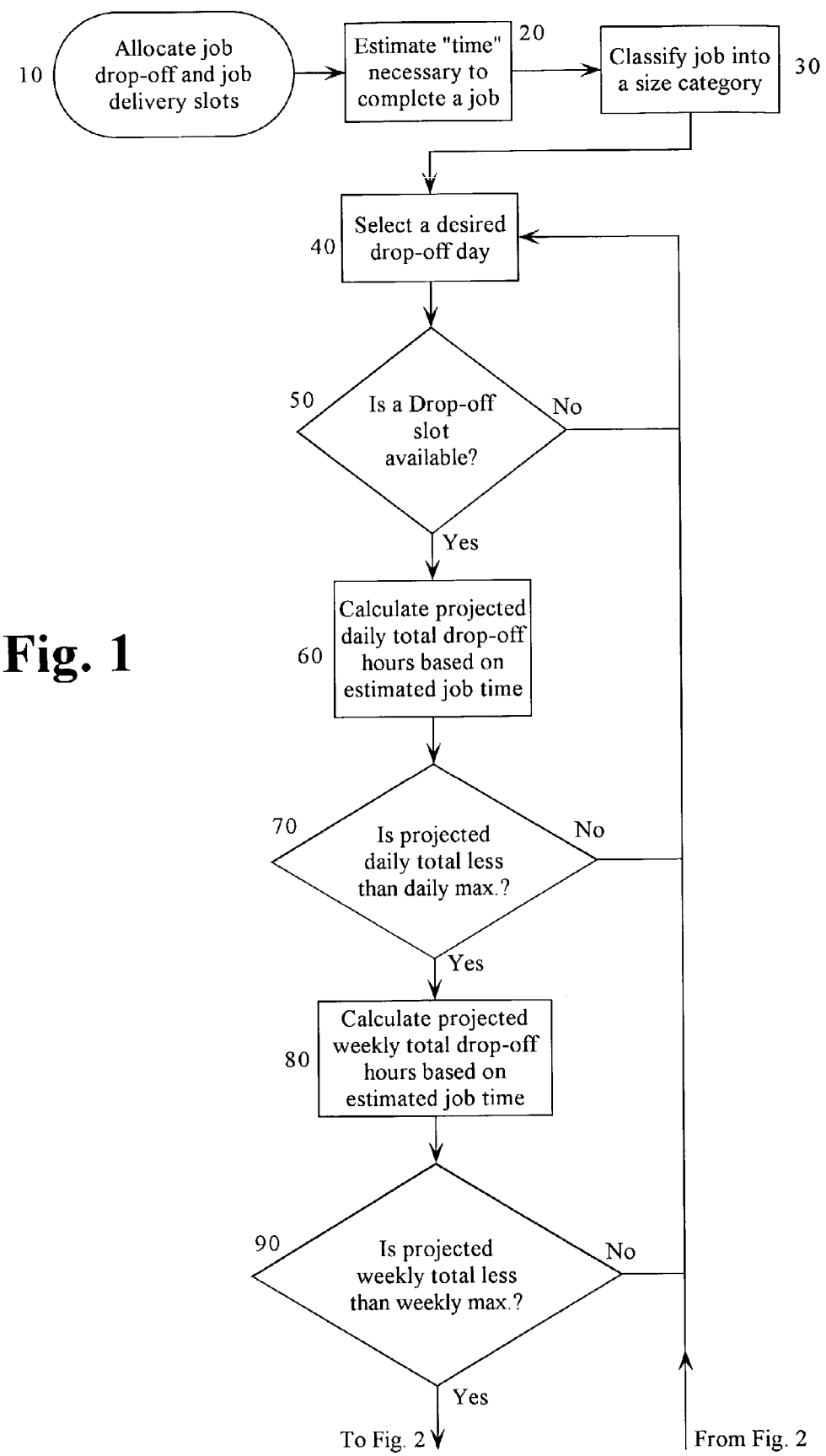
FIGS. 1 and 2 are flow charts showing, generally, the method steps associated with the inventive method of scheduling an appointment for a vehicle collision repair service provider.
Figure 2:
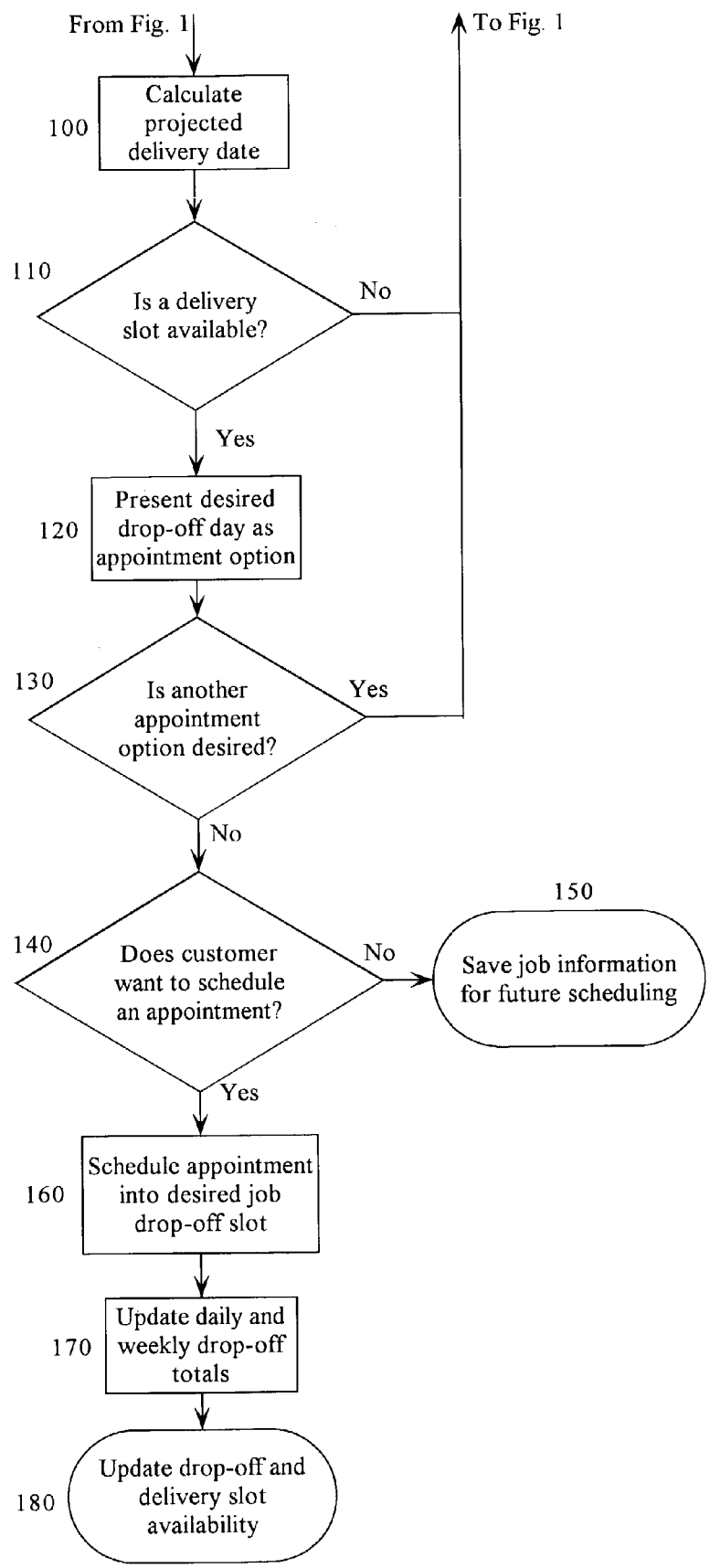

Referring to FIGS. 1 and 2, a flow chart showing the method steps associated with a preferred embodiment of the appointment scheduling method of the instant invention is provided. The preferred embodiment of the instant invention allows a service provider to schedule appointments so as to balance the intake and outflow of new jobs to improve the efficiency of work flowing through the service provider's facility. In the method shown in the preferred embodiment, the service provider is a vehicle collision repair service provider, and the appointments scheduled are for vehicle collision repair jobs. Nevertheless, the inventive method could be utilized in connection with scheduling appointments for any service provider, or in any other situation where appointments are scheduled. For example, the inventive method could be utilized in connection with scheduling appointments for a medical or dental service provider.

In the preferred embodiment of the instant invention, multiple users in a single facility can schedule work for the service provider simultaneously. Computer terminals are located at the service provider's facility and connected to a single computer server. In the case of a vehicle collision repair facility, the computer terminals are located at the desks of collision repair service writers, or estimators. A computer program that includes and manages a schedule database is located on the computer server. The computer program is accessed by the service writers via the computer terminals to schedule appointments. When a service writer schedules an appointment into the schedule database, that service writer is registered in the schedule database as the estimator. In addition to services writers, other personnel at a collision repair facility may be provided access to the computer program either for monitoring or for data entry purposes. Receptionists, service managers, owners, production managers, parts managers, as well as non-production staff may all have reasons for accessing the computer program, and may all have computer terminals that access the server. Given the range of personnel that may have a reason to access the computer program and the schedule database, the service provider can restrict access to portions or all of the schedule database and the computer program through user position classifications and log-on procedures to prevent unauthorized data entry.

It is understood that components of the computer program that provide for management of the schedule database can be located on the computer terminals rather than on the server. In such case, the server will merely be used for storage of the schedule database. Additionally, it is understood that in certain situations, such as smaller collision repair facilities, it may not be necessary to provide multiple service writers with access to the schedule database. In such situations the schedule database may be located on a single computer terminal without the use of a central computer server.

In the preferred embodiment, the computer server for the computer program and schedule database is located at the collision repair facility. Nevertheless, it is understood that the central computer server can be located off-site from the repair facility and connected to the computer terminals located at the facility by any means that is known in the art. For example, an off-site computer server can be accessed remotely by the computer terminals over the internet.

In addition to allowing access to the schedule database from multiple terminals at a single facility location, placement of the schedule database on a central computer server will allow access to the schedule database from remote facility locations that are connected to the central computer server. This is extremely beneficial for service providers that have multiple facility locations. For example of a service provider with two facility locations, the central computer server can be located at either a first facility location, a second facility location, or at an off-site location. Computer terminals at the first and second facility locations are connected to the central computer server. For the terminals that are located at a location remote to the computer server, either because the server is located off-site or at the other facility location, the connection between the terminals and the server can be accomplished via the internet, or using any other connection that is known in the art. The schedule database includes a "facility" field for each schedule record, permitting scheduling for both facilities within the single database. Service writers located at the first facility will access the schedule database and specify the first facility in the facility field to schedule appointments for collision repairs to be performed at the first facility, and service writers at the second facility will access the schedule database and specify the second facility in the facility field to schedule appointments for collision repairs to be performed at the second facility. Additionally, the service writers at the first facility can access the schedule database and specify the second facility in the facility field to schedule appointments for collision repairs to be performed at the second facility, and the service writers at the second facility can access the schedule database and specify the first facility in the facility field to schedule appointments for collision repairs to be performed at the first facility. This allows for load balancing between the two facilities. Thus, if the workload is relatively high at the first facility, but low at the second facility, the service writers at the first facility can schedule repair jobs for the second facility to balance the workload.

In larger collision repair facilities, and especially for service providers that have multiple facility locations, it may be desirable to provide multiple schedule databases that are connected to each other. For example of a service provider with two facility locations, a first schedule database will be located on a server at a first facility, and a second schedule database will be located on a server at a second facility. The first and second schedule databases are connected to each other via the internet, or using any other connection that is known in the art. Service writers located at the first facility will access the first schedule database to schedule appointments for collision repairs to be performed at the first facility, and service writers at the second facility will access the second schedule database to schedule appointments for collision repairs to be performed at the second facility. Additionally, the service writers at the first facility can access the second schedule database, and the service writers at the second facility can access the first schedule database via the internet connection. This allows for load balancing between the two facilities. Thus, if the workload is relatively high at the first facility, but low at the second facility, the service writers at the first facility can schedule repair jobs for the second facility to balance the workload.

It will be obvious to a person of ordinary skill in the art, that the actual physical location of the schedule database(s) is irrelevant to the method of the instant invention. The schedule databases can be located at the facilities for which they contain schedule data, both schedule databases for a first and second facility can be located at a first facility or at a second facility, or schedule databases may be located off-site from the facilities for which the contain scheduling data.

In the method of scheduling appointments of the instant invention, job drop-off and job delivery slots for a facility are allocated throughout a production period in step 10. For a vehicle collision service provider, job drop-off slots are defined as times when a customer can drop-off their vehicle for repairs to be performed by the service providers. Similarly, job delivery slots are defined as times when repairs to a customer's vehicle have been completed and the vehicle is ready for pickup by, or delivery to, the customer.

In the preferred embodiment, allocation of job drop-off and job delivery slots is performed by a module of the computer program that is located on the computer server and which stores the job drop-off and job delivery slots in the schedule database. The service provider initiates slot allocation by accessing a set-up wizard of the computer program. The set-up wizard first prompts the service provider to select a schedule database for the particular facility location in which slot allocation is desired.

The wizard then prompts the service provider to determine how capacity is to be defined within the facility. For example, a collision repair service provider might choose to define capacity based upon total labor hours, metal hours, or refinish hours. This allows the service provider to schedule appointments based upon its "bottle-neck" department's capacity. For example, if repairs are usually held up at the refinish department (i.e. for painting) at the facility, and the metal repair department does not create a similar bottleneck, the service provider may choose to define its capacity by refinish hours or vice-versa if a bottle-neck is maintained in the metal department. If however both departments maintain bottle-necks, or if neither maintain bottle-necks, the service provider would probably choose to schedule by total hours.

After the service provider has determined how to define capacity within the facility, the wizard will prompt the service provider to input a target annual dollar sales goal for the facility, an average dollar per booked hour collected by the facility, the average ratio of labor sales to total sales for the facility, the cycle time factor for the facility in hours produced per day per repair order, and the supplement factor (i.e. average for additional work required to complete repairs that was not shown on the original work estimate) for the facility. The computer then uses the inputted information to calculate the total labor hours that the facility must produce per week to meet the target sales goal. The service provider is prompted to confirm whether the facility is capable of meeting the weekly hour production. If the facility is not capable of the calculated weekly hour production, the provider is prompted to modify the inputted data.

Once the service provider has inputted a target sales goal and other facility data that results in a weekly hour production within the facilities capabilities, the service provider will be prompted to define job size categories. Generally, a vehicle repair facility will be prompted to enter hour ranges for completing small, medium, large and heavy hit jobs. For example a small job range may be between 0 and 15 hours to complete, a medium job range between 15 and 25 hours to complete, a large job range between 25 and 35 hours to complete, and a heavy hit job range greater than 35 hours to complete. The service provider will also be prompted to enter an average number of hours for completing a job in each job category.

In the specific example of the preferred embodiment of a vehicle collision repair service provider, it is understood that time estimates for completion of repair jobs are based upon standards set by insurance companies and other similar database providers. Such time estimates are often referred to as "funny time," because they are not always indicative of the actual amount of time that is required for completion of a repair job. Thus, an estimate of five hours for a repair job may actually take one facility three hours to complete, and may take another facility five hours to complete. In some situations, estimates are made and billed in repair units, which can generally be correlated to an amount of time that is allocated for the repair job. In the example of the preferred embodiment described herein, the estimated job time is the time allotted a particular job based upon the "funny time" described above. Nevertheless, it is within the scope of the instant invention to utilize actual time estimates, or even repair units that generally correlate to an amount of time, as the estimated job time.

The service provider will then be prompted to enter the percentage of hours that is desired to be allocated to each size category. For example, the service provider might allocate 50% of the total hours within a production period to heavy hit jobs, 10% to small jobs, 20% to medium jobs and 20% to large jobs. This allows the service provider to focus a higher percentages of total labor hours to the types of jobs for which the facility may have better capabilities and thus result in higher profitability.

Next, the wizard prompts the service provider to enter the number of days per week that production occurs in the facility, and to specify those production days. If the facility is not capable of producing an equal number of hours on each production day, the service provider is prompted to spread the total weekly hours required to be produced by the facility throughout the production days for the week.

Once the production hours have been appropriately spread throughout the week, the service provider is prompted to enter the daily and weekly capacity variances. These variances are the percentages by which the actual scheduled hours can exceed the targeted production hours for any given day or week.

Finally, the service provider is prompted with the option to exclude small jobs from being scheduled for drop-off on the last production day of the week to avoid the possibility of carrying smaller jobs over the weekend. The data entered by the service provider is stored within the schedule database for use in allocating drop-off and delivery slots, and for use in scheduling appointments.

After all the data has been entered by the service provider, the computer program uses the data to allocate job drop-off slots throughout a production period such as a calendar week. The program will begin by determining the number of jobs of each job size category that are required each week to achieve the sales goal for the facility and based upon the percentage of hours set by the service provider. Then the program continues by allocating drop-off slots for heavy hit jobs, then large, medium and finally small jobs throughout the production week. In the preferred embodiment, the program will allocate a job delivery slot for every job drop-off slot. Generally, one job delivery slot will be provided for each job drop-off slot of a production week. Thus, a week that has twenty-five job drop-off slots will also have twenty-five job delivery slots available. While job drop-off slots are of specified size categories, the job delivery slots do not have any size limitations. Thus a job delivery slot can be used for delivery of a job of any size category. The allocated job delivery and job drop-off slots are stored in the schedule database along with daily maximum drop-off hours and weekly maximum drop-off hours that are determined based upon the inputted data. The service provider can adjust the drop-off and delivery capacities on selected days to accommodate employee vacations, injuries, health issues, non-productions days, jury duty, etc. In some situations it may be desirable to require that an existing job be delivered before a new job can be dropped off. In such a situation, the program will allocate a job delivery slot for the existing job on the same day as a job drop-off slot for the new job.

Once job drop-off and job delivery slots have been allocated in step 10 and stored in the schedule database, actual repair jobs can be scheduled using the inventive scheduling method. A customer will bring a vehicle in need of repair to the vehicle collision repair service provider's facility. In step 20, the service writer will examine the vehicle and provide a repair estimate which includes an estimated time necessary to complete the vehicle repair. Alternatively, in step 20, the service writer may work off of an estimate that has already been provided, such as an estimate made on an earlier date by the service writer or an estimate from a different service writer or an insurance company claim adjuster. The service writer will then access the computer program using the service writer's computer terminal and enter the estimated repair time and other information about the repair, such as customer name, repair payment source (insurance company), cost estimate for repair, etc., into the computer program. The computer program will use the estimated repair time to classify in step 30 the repair job into one of the job size categories defined during the slot allocation process.

Once the estimated repair time is entered into the computer program in step 20, the computer program will manipulate the estimated time based upon a supplement factor, a cycle time factor, job size category and/or repair payment source. Supplement factors and cycle times may vary significantly based upon the payment source and/or based upon the job size category. Additionally, supplement factors and cycle times may vary based upon the facility in which the work is performed. In the preferred embodiment, the computer program first determines if a supplement factor and/or cycle time factor corresponding to the payment source and size categorization for the repair job for the facility are available. If available for payment source and size categorization then such supplement factor and/or cycle time factor are used for adjusting the estimated time for repair. If not available for payment source and size categorization, then the program determines if the supplement factor and/or cycle time corresponding to the payment source for the repair job for the facility are available. If available for payment source then such supplement factor and/or cycle time factor are used for adjusting the estimated time for repair. If not available for payment source, then the program determines if the supplement factor and/or cycle time corresponding to the size categorization of the job to be scheduled for the facility is available. If available for size categorization then such supplement factor and/or cycle time factor are used for adjusting the estimated time for repair. If not available for size categorization, then the program uses the supplement factor and/or cycle time factor for the facility. The service provider can set the program to continually "learn" or update the average supplement factor and average cycle time by facility, payment source, and size categorization as new data is entered, and use the updated average supplement factor and average cycle time to improve scheduling. If a supplement factor and/or cycle time factor has been "learned" for the facility through data entry, the computer program will use those "learned" supplement and/or cycle time factors. Otherwise, the program will use the supplement and/or cycle time factors that were imputed by the service provider through the set-up wizard.

A desired drop-off day for the repair is selected at step 40. In the preferred embodiment, the desired drop-off day defaults to the production day following the current date in which the estimate is made. The computer program then performs an iterative process to determine whether the vehicle can be dropped off on the desired drop-off day. If the vehicle cannot be dropped off on the desired drop-off day, the computer program incrementally advances one day at a time performing the same iterative process until a first available day is calculated for which an appointment can be scheduled to drop-off the vehicle for repairs. Alternatively, the program may allow the service writer to enter a desired drop-off date, such as the current date, or a date sometime in the future. In the preferred embodiment, such entry overrides the iterative process of determining drop-off date availability. Nevertheless, it is within the scope of the instant invention to design the computer program to perform the iterative, incrementally advancing one day at a time to calculate a first available drop-off slot calculated from the entered date.

The iterative process for calculating a first-available drop-off slot begins with the computer program reviewing the schedule database and determining at step 50 whether a drop-off slot of the job size category of the repair job is available on the desired drop-off day for a job. If a job drop-off slot is not available the program returns to step 40 and selects a new desired drop-off day. As is discussed above, in the preferred embodiment, the computer program will increment by one production day. Thus, the new desired drop-off day will be the production day directly following the original desired drop-off day. Step 50 will be repeated for the new desired production day, and steps 40 and 50 will continue to be repeated until a day is found that has a drop-off slot of the appropriate job size category.

After a day having the appropriate job size category has been located, the computer program calculates at step 60 a projected daily total hours by adding the estimated hours, which have been adjusted by the supplement factor and/or cycle time factor, for the repair job to a daily total hours that are already stored in the schedule database for that day. The computer program then compares at step 70 the projected daily total drop-off hours to a daily maximum drop-off hours stored within the schedule database. If the projected daily total drop-off hours are higher than the daily maximum drop-off hours, the computer program will return to step 40 and select a new desired drop-off day. As is discussed above, in the preferred embodiment, the computer program will increment one production day at a time to select a new desired drop-off day.

Once a desired drop-off day is determined in which the projected daily total drop-off hours is less than the daily maximum drop-off hours, the computer program will calculate at step 80 a projected weekly total drop-off hours by adding the estimated time, which has been adjusted by the supplement factor and/or cycle time factor, for the repair job to a weekly total drop-off hours that are stored in the schedule database. The computer program then compares at step 90 the projected weekly total drop-off hours to a weekly maximum drop-off hours stored within the schedule database. If the projected weekly total drop-off hours are higher than the weekly maximum drop-off hours, the computer program will return to step 40 and select a new desired drop-off day. As is discussed above, in the preferred embodiment, the computer program will increment one production day at a time to select a new desired drop-off day.

Once a desired drop-off day is determined in which the projected weekly total drop-off hours is less than the weekly maximum drop-off hours, the computer program will at step 100 calculate a projected delivery date in which the repair job will be completed. The projected delivery date is calculated based upon the desired drop-off date and using, among other factors, the estimated time for the repair job. The computer program then determines at step 110 whether a delivery slot is available in the schedule database on the projected delivery date. If a deliver slot is not available the computer program will return to step 40 and select a new desired drop-off day. As is discussed above, in the preferred embodiment, the computer program will increment one production day at a time to select a new desired drop-off day.

If a delivery slot is available on the desired drop-off day, the computer program will present at step 120 the desired drop-off day as an appointment option for which the repair job can be scheduled. The appointment option will be presented or displayed on the computer terminal of the service writer along with a projected delivery date and the total number of days the repair job is expected to be in-process. In the preferred embodiment, the computer program will provide the service writer and/or the customer with three appointment options for scheduling the repair. Thus, at step 130, the computer program will return to step 40 and select a new desired drop-off day, continuing the process until three appointment options have been presented. If the three appointment options that are presented to the customer are not acceptable, at step 130 the customer can request a specific drop-off date, and the service writer can manually schedule drop-off for that date regardless of drop-off slot availability. It is also within the scope of the instant invention to return to step 40, select a new desired drop-off day and ultimately present new appointment options until an acceptable option is achieved.

At step 140, the customer decides whether or not to schedule an appointment. If the customer does not desire to schedule an appointment at the time the estimate is made, the computer program will at step 150 store the information about the repair, including customer information, cost estimate for repair, etc. in a storage database. This information can then be recalled and the repair job can be rescheduled at a later date without the need for reentry of the repair job data into the computer program.

If the customer does want to schedule an appointment, at step 160 the service writer will select the appointment option in which the customer desires to schedule the repair and the program will schedule the appointment into the selected job drop-off slot, thereby consuming that slot. Also, if the customer insists on scheduling an appointment on a date for which an appointment option is not available, the service writer can override the schedule options offered by the computer program, and at step 160 schedule the appointment into the date desired by the customer.

At step 170 the computer program will update the daily total drop-off hours and the weekly total drop-off hours to include the estimated time, which has been adjusted by the supplement factor and/or cycle time factor, for the repair job. These updated daily and weekly total drop-off hours will be utilized for any subsequent schedule option calculations. At step 180, when the program schedules the appointment into the selected job drop-off slot, the program will make that drop-off slot unavailable for any other schedule options. The program will also determine the projected delivery day for the repair job and schedule delivery of the repair job into a delivery slot on the projected delivery day, making that delivery slot unavailable for any other schedule options.

The program provides a graphical display of the scheduled volume of work. A monthly calendar is displayed and variations in the shading and/or color a specific production day signifies the percentage of the total drop-off capacity that has been scheduled for that day. For example, dark orange shading can be used to signify 100% capacity, with very light orange or no shading signifying 0% capacity, and varying shades of orange to signify capacity between 0% and 100%.

The program also provides a variety of management reports that can be viewed on a computer screen or printed for review by the service provider. Examples of reports provided by the program include, vehicle drop-offs, vehicle deliveries, work in progress, week day analysis, supplements, cycle time, lead time, unscheduled estimates, and closing ratio.

A Vehicle Drop-Offs report includes a listing of the customers that are scheduled to drop off, or have already dropped off, vehicles for repairs during a user-specified time period. The listing includes items such as the customer name and phone number, descriptive information on the vehicle (e.g., make, model, color), and information on the repairs (e.g., payment source, estimated sales, expected delivery date, etc.). This information is grouped by day with daily subtotals for the number of vehicles to be dropped off and the hours and sales estimated on the repairs.

A Vehicle Deliveries report includes a listing of the customers that are scheduled to have, or have already had, vehicles delivered back to them repaired during a user-specified time period. The listing includes items such as the customer name and phone number, descriptive information on the vehicle (e.g., make, model, color), and information on the repairs (e.g., payment source, estimate hours, estimated sales, etc.). This information is grouped by day with daily subtotals for the number of vehicles to be delivered and the hours and sales estimated on the repairs.

A Work in Process report includes a listing of customers that have vehicles that are in the process of being repaired as of a user-specified date. The listing includes items such as the customer name, descriptive information on the vehicle (e.g., make, model, color), and information on the repairs (e.g., payment source, estimate hours, estimated sales, etc.). The number of customers, estimated sales and estimated hours are totaled at the bottom of the report.

Week Day Analysis is series of reports that lists the number and percentage of estimates written, vehicles dropped off, and vehicles delivered by day of the week for a user-specified time period. Reports are available that provide this information for the facility, for individual estimators, and for individual payment sources.

Supplements are two reports that provide measurements of the magnitude of the supplements (i.e., the difference between the original estimate of the cost to repair the vehicle and the final bill for the repairs) for the repair facility. Both reports provide supplement estimates, reported as a percentage of the original estimated cost, for work performed by the facility. They also provide supplement estimates for jobs from: 1) each job size category defined by the user in the program wizard; 2) each payment source; and 3) each job size category within each payment source. The Supplement Values for Scheduling report uses only the most current jobs to determine the magnitude of supplements, while the Actual Supplement History report uses all of the jobs delivered within a user-defined time period.

Cycle Time are two reports that provide measurements of the speed with which repairs are completed at the facility. Both reports provide cycle time estimates, reported as the average number of hours produced per production day per repair order, for the facility. They also provide cycle time estimates for jobs from: 1) each job size category defined by the user in the program wizard; 2) each payment source; and 3) each job size category within each payment source. The Cycle Times Values for Scheduling report uses only the most current jobs to determine the cycle time, while the Actual Cycle Time per Production Day report uses all of the jobs delivered within a user-defined time period.

Lead Time is a series of reports that shows the number of days between the scheduling of the repairs and the vehicle drop off date for vehicles scheduled during a user-defined time period. This can be considered the time that the customer waits for repairs to begin. Reports are available that will show lead times for the facility or lead times by estimator, payment source, job size, and payment source by job size.

Unscheduled Estimates are two reports that track the customers that chose to not schedule their vehicle for repairs during the initial estimating contact with the facility during a user-specified time period. The Unscheduled Estimated report lists these customers, including such items as the customer name, descriptive information on the vehicle (e.g., make, model, color), and information on the repairs (e.g., payment source, estimate hours, estimated sales, etc.). The list is grouped by estimator. Each list by estimator is further grouped by the current status of the repair. These include Open, Followed Up, Will Not Schedule, and Scheduled. Repairs that have subsequently been scheduled are classified as scheduled. Repairs that the customer has indicated will not be repaired at this facility are listed as Will Not Schedule. Customers who have been contacted since the original estimating contact but that have not yet decided whether to schedule or not are shown as Followed Up. Any remaining customers are listed as Open. The Unscheduled Estimate Analysis report shows the total number of customers for each status group by estimator and for the facility as a whole. It also subtotals the number of customers and estimated sales and hours for estimators and for the facility.

Closing Ratio are two reports that show the success rate of the estimators and the facility in being allowed to repair vehicles that they have seen during the estimating process for a user-specified time period. Closing Ratio—Estimator shows, by estimator, the number of sales opportunities and the number of those opportunities that the estimator was able to schedule for repairs. The ratio between these two numbers is shown as the closing ratio. These numbers are also reported for the facility as a whole. The Closing Ratio—In Sales $ is a very similar report. However, instead of tracking sales opportunities, this report shows the estimated sales dollars on the opportunities and the estimated sales dollars on those opportunities that were scheduled for repairs. The ratio between these two numbers is presented as the closing ratio in this report. In addition, since there may be a time lag between when a sales opportunity occurs and when it is successfully scheduled, both of these reports allow the user to set a lag time to allow the sales opportunity to be scheduled.

The computer program provides the service provider with the ability to transfer the schedule database to a system administrator, such as the program developer, for support or data-mining purposes using a file transfer protocol or some other means of access that is known in the art. For example, a system administrator may access the schedule database through an internet connection to the computer server.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive appointment scheduling and load leveling system is constructed and used, the characteristics of the construction, and advantageous, new and useful results obtained; the new and useful methods, structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A method of scheduling appointments, said method comprising the steps of:
    allocating job drop-off slots of varying size categories throughout a production period based upon a provider's sales goals;
    requiring that a job delivery slot correspond to each job drop-off slot;
    estimating a time necessary to complete a vehicle collision repair job for a customer as an estimated time;
    classifying said collision repair job into one of said size categories based upon said estimated time;
    selecting a desired drop-off day within said production period and repeating the following steps until at least one appointment option is presented:
        if a job drop-off slot of said size category of said job is available on said desired drop-off day, then adding said estimated time to a daily drop-off total hours already scheduled to determine a projected daily drop-off total, and
            if said projected daily drop-off total is less than a daily drop-off maximum, then adding said estimated time to a weekly drop-off total hours already scheduled to determine a projected weekly drop-off total, and
                if said projected weekly drop-off total is less than a weekly drop-off maximum, then calculating a projected delivery date, and
                    if a delivery slot is available on said projected delivery date, then presenting said desired drop-off day as an appointment option,
                    else proceeding to a next desired drop-off day if a delivery slot is not available on said projected delivery date,
                else proceeding to a next desired drop-off day if said projected weekly drop-off total is greater than said weekly drop-off maximum,
            else proceeding to a next desired drop-off day if said projected daily drop-off total is greater than said daily drop-off maximum,
        else proceeding to a next desired drop-off day if a job drop-off slot of said size category of said job is not available;
    permitting said customer to accept or reject said at least one appointment option; and
    upon acceptance of said at least one appointment option by said customer, scheduling said job for said appointment option, consuming said drop-off slot of said accepted appointment option, consuming said delivery slot of said projected delivery date of said accepted appointment option, and increasing each of said daily drop-off total and said weekly drop-off total by said estimated time.

2. A method of scheduling appointments, said method comprising the steps of:
    allocating job drop-off slots of varying size categories throughout a production period based upon a provider's sales goals;
    requiring that a job delivery slot correspond to each job drop-off slot;
    estimating a time necessary to complete a vehicle collision repair job for a customer as an estimated time;
    classifying said collision repair job into one of said size categories based upon said estimated time;
    selecting a desired drop-off day within said production period and repeating the following steps until at least one appointment option is presented:

if a job drop-off slot of said size category of said job is available on said desired drop-off day, then adding said estimated time to a daily drop-off total hours already scheduled to determine a projected daily drop-off total, and
  if said projected daily drop-off total is less than a daily drop-off maximum, then adding said estimated time to a weekly drop-off total hours already scheduled to determine a projected weekly drop-off total, and
    if said projected weekly drop-off total is less than a weekly drop-off maximum, then calculating a projected delivery date, and
    if a delivery slot is available on said projected delivery date, then presenting said desired drop-off day as an appointment option,
    else proceeding to a next desired drop-off day if a delivery slot is not available on said projected delivery date,
    else proceeding to a next desired drop-off day if said projected weekly drop-off total is greater than said weekly drop-off maximum,
  else proceeding to a next desired drop-off day if said projected daily drop-off total is greater than said daily drop-off maximum,
else proceeding to a next desired drop-off day if a job drop-off slot of said size category of said job is not available;
utilizing payment source information for said job to further determine whether a specific drop-off slot is available;
permitting said customer to accept or reject said at least one appointment option; and
upon acceptance of said at least one appointment option by said customer, scheduling said job for said appointment option, consuming said drop-off slot of said accepted appointment option, consuming said delivery slot of said projected delivery date of said accepted appointment option, and increasing each of said daily drop-off total and said weekly drop-off total by said estimated time.

3. A method of scheduling appointments, said method comprising the steps of:
allocating job drop-off slots of varying size categories throughout a production period based upon a provider's sales goals;
requiring that a job delivery slot correspond to each job drop-off slot;
estimating a time necessary to complete a vehicle collision repair job for a customer as an estimated time, including applying a supplement factor and/or cycle-time factor to said estimated time necessary to complete said job;
classifying said collision repair job into one of said size categories based upon said estimated time;
selecting a desired drop-off day within said production period and repeating the following steps until at least one appointment option is presented:
  if a job drop-off slot of said size category of said job is available on said desired drop-off day, then adding said estimated time to a daily drop-off total hours already scheduled to determine a projected daily drop-off total, and
    if said projected daily drop-off total is less than a daily drop-off maximum, then adding said estimated time to a weekly drop-off total hours already scheduled to determine a projected weekly drop-off total, and
      if said projected weekly drop-off total is less than a weekly drop-off maximum, then calculating a projected delivery date, and
      if a delivery slot is available on said projected delivery date, then presenting said desired drop-off day as an appointment option,
      else proceeding to a next desired drop-off day if a delivery slot is not available on said projected delivery date,
    else proceeding to a next desired drop-off day if said projected weekly drop-off total is greater than said weekly drop-off maximum,
  else proceeding to a next desired drop-off day if said projected daily drop-off total is greater than said daily drop-off maximum,
else proceeding to a next desired drop-off day if a job drop-off slot of said size category of said job is not available;
permitting said customer to accept or reject said at least one appointment option; and
upon acceptance of said at least one appointment option by said customer, scheduling said job for said appointment option, consuming said drop-off slot of said accepted appointment option, consuming said delivery slot of said projected delivery date of said accepted appointment option, and increasing each of said daily drop-off total and said weekly drop-off total by said estimated time.

4. The method as set forth in claim 3, further including the step of updating an average supplement factor and/or cycle-time factor based upon information about said job.

* * * * *